United States Patent
Balidas et al.

(10) Patent No.: US 10,442,708 B2
(45) Date of Patent: Oct. 15, 2019

(54) METHOD AND APPLIANCE FOR TREATING WATER

(71) Applicant: BWT Aqua AG, Aesch (CH)

(72) Inventors: Pierre Balidas, Uffheim (FR); Swen Beusshausen, Steinen (DE); Christian Brand, Brunstatt (FR); Jürgen Johann, Nussloch (DE)

(73) Assignee: BWT AQUA AG, Aesch (CH)

( * ) Notice: Subject to any disclaimer, the term of this patent is extended or adjusted under 35 U.S.C. 154(b) by 1030 days.

(21) Appl. No.: 14/403,295

(22) PCT Filed: Apr. 29, 2013

(86) PCT No.: PCT/EP2013/058915
§ 371 (c)(1),
(2) Date: Nov. 24, 2014

(87) PCT Pub. No.: WO2013/174628
PCT Pub. Date: Nov. 28, 2013

(65) Prior Publication Data
US 2015/0175445 A1    Jun. 25, 2015

(30) Foreign Application Priority Data
May 24, 2012    (DE) .......... 10 2012 208 778

(51) Int. Cl.
*C02F 1/44*    (2006.01)
*C02F 1/48*    (2006.01)
(Continued)

(52) U.S. Cl.
CPC .......... *C02F 1/44* (2013.01); *B01D 61/58* (2013.01); *B01D 63/10* (2013.01); *C02F 1/48* (2013.01);
(Continued)

(58) Field of Classification Search
CPC ........ B01D 2311/2653; B01D 2311/25; B01D 2317/022; B01D 2317/06; B01D 61/48;
(Continued)

(56) References Cited

U.S. PATENT DOCUMENTS 5,322,222 A * 6/1994 Lott .................. B05B 7/0408
                                                     239/396
5,980,716 A * 11/1999 Horinouchi ............. C02F 9/00
                                                     204/524

(Continued)

FOREIGN PATENT DOCUMENTS

DE    100 05 968       8/2001
EP    1 803 689 A1     7/2007
WO    2010/054782 A1   5/2010

*Primary Examiner* — Bobby Ramdhanie
*Assistant Examiner* — Michael J An
(74) *Attorney, Agent, or Firm* — DLA Piper LLP (US)

(57) ABSTRACT

A process of treating water includes a membrane separation stage and a deionization stage separating raw water into a first concentrate stream and permeate stream, the first concentrate stream is separated at least in part into a second concentrate stream and permeate stream, the first permeate stream is fed into a diluate chamber from which it exits again as a product stream, the second permeate stream is fed into a downstream electrodeionization appliance from which it exits as a third concentrate stream, and the second and the third concentrate streams are degassed and added to the raw water stream before the stream is fed into the membrane separation stage.

7 Claims, 3 Drawing Sheets

(51) Int. Cl.
*C02F 9/00* (2006.01)
*B01D 61/58* (2006.01)
*B01D 63/10* (2006.01)
B01D 61/02 (2006.01)
C02F 1/20 (2006.01)
C02F 1/28 (2006.01)
C02F 1/469 (2006.01)
C02F 1/72 (2006.01)
C02F 1/78 (2006.01)
C02F 103/04 (2006.01)
B01D 61/48 (2006.01)
C02F 103/34 (2006.01)

(52) U.S. Cl.
CPC .............. *C02F 9/00* (2013.01); *B01D 61/025* (2013.01); *B01D 61/027* (2013.01); *B01D 61/48* (2013.01); *B01D 2311/04* (2013.01); *B01D 2311/06* (2013.01); *B01D 2311/08* (2013.01); *B01D 2311/25* (2013.01); *B01D 2317/022* (2013.01); *B01D 2317/025* (2013.01); *B01D 2317/06* (2013.01); *B01D 2317/08* (2013.01); *C02F 1/20* (2013.01); *C02F 1/28* (2013.01); *C02F 1/441* (2013.01); *C02F 1/442* (2013.01); *C02F 1/4695* (2013.01); *C02F 1/722* (2013.01); *C02F 1/78* (2013.01); *C02F 2103/04* (2013.01); *C02F 2103/346* (2013.01); *C02F 2301/043* (2013.01)

(58) Field of Classification Search
CPC .... B01D 61/58; C02F 1/4695; C02F 2103/04; C02F 9/00
See application file for complete search history.

(56) References Cited

U.S. PATENT DOCUMENTS

| | | | |
|---|---|---|---|
| 6,056,878 A * | 5/2000 | Tessier | B01D 61/48 204/524 |
| 6,120,689 A * | 9/2000 | Tonelli | B01D 61/022 210/180 |
| 6,461,512 B1 | 10/2002 | Hirayama et al. | |
| 2006/0163056 A1* | 7/2006 | Grebenyuk | B01D 61/46 204/260 |
| 2008/0264773 A1 | 10/2008 | Searles | |
| 2010/0018921 A1* | 1/2010 | Ruehr | B01D 61/025 210/636 |
| 2011/0024361 A1* | 2/2011 | Schwartzel | C02F 1/325 210/739 |
| 2011/0259824 A1* | 10/2011 | Neubrand | B01D 61/022 210/638 |

* cited by examiner

METHOD AND APPLIANCE FOR TREATING WATER

TECHNICAL FIELD

This disclosure relates to a multistage process of treating water and a unit for carrying out the process.

BACKGROUND

The treatment of water is currently of constantly increasing importance. In addition to drinking water, especially in the chemical and pharmaceutical industries, high-purity process waters are required which must be prepared in a large quantity as inexpensively as possible. High-purity water, in addition, is especially also required in the semiconductor industry, for example, for rinsing silicon wafers, in particular after etching processes. The purity requirements of the water are known to be particularly high in this sector.

Known processes that provide ultrapure water are multistage processes comprising a first stage in which the raw water is softened and/or already partially desalinated, a second stage in which the water from the first stage is further purified in a pressure-driven membrane separation process, and a third stage in which the water is finally substantially completely deionized, for example, by electrodeionization (EDI). Additional process steps, for example, to eliminate organic impurities, can be provided.

Water softening and/or desalination in the first stage generally proceed by use of one or more ion exchangers. For the softening, cation exchangers in the sodium form are preferably used, whereas for the desalination, combinations of cation and anion exchangers are customary. The total ionic load of the water to be treated can be markedly reduced already by such methods.

Membrane separation processes which come into consideration are, in particular, reverse osmosis and nanofiltration, optionally also in combination with one another. If relatively large amounts of dissolved carbon dioxide are present in the raw water, an additional degassing step can be provided before or after the membrane separation process.

If a high water yield is of importance, the concentrate from the membrane separation stage can be treated in a further additional membrane separation stage.

Electrodeionization appliances, in customary designs, always require a solution which takes up the ions separated off from the water to be treated and discharges them (concentrate) from the device. That solution flows through at least one concentrate chamber, and the water that is to be treated through at least one diluate chamber. A high ionic conductivity in the concentrate chambers is known to be achieved, in particular, by the following:
- an addition, e.g., of neutral salts, is conducted,
- the concentrate being recirculated through the concentrate chambers such that the ions that are separated off accumulate there or
- the concentrate chambers (as also optionally the diluate chambers) are packed with ion-exchange resins.

WO 2010/054782 A1 discloses a multistage process of treating water in which a water stream is fed to a first membrane separation device where the water stream is divided into a concentrate stream and a permeate stream. The permeate stream is fed to a downstream electrodeionization appliance, the concentrate stream is processed in a second membrane separation device. The permeate exiting from the second membrane separation device is fed into the concentrate chambers of the downstream electrodeionization appliance and further utilized in this manner. Concentrate exiting from the electrodeionization appliance can optionally be fed back into the inlet of the first membrane separation device.

It could therefore be helpful to improve known water-purifying processes having a sequence of membrane separation devices and electrodeionization appliances, in particular with respect to the water yield to be achieved.

SUMMARY

We provide a multistage process for treating water in which a raw water stream is first fed into a membrane separation stage and then further purified in a deionization stage downstream thereof, wherein the membrane separation stage includes a first and a second membrane separation device and the deionization stage includes an electrodeionization appliance having at least one concentrate chamber and at least one diluate chamber, the raw water stream in the first membrane separation device is separated into a first concentrate stream and a first permeate stream, the first concentrate stream is separated at least in part in the second membrane separation device into a second concentrate stream and a second permeate stream, the first permeate stream is fed into the at least one diluate chamber of the downstream electrodeionization appliance, from which it exits again as product stream, the second permeate stream is fed into the at least one concentrate chamber of the downstream electrodeionization appliance, from which is exits as third concentrate stream, and the second and the third concentrate streams are degassed in a device that degasses water and are added to the raw water stream before the stream is fed into the membrane separation stage.

We also provide a unit that carries out the process including a first membrane separation device having an inlet for water to be treated, an outlet for permeate and an outlet for concentrate, a second membrane separation device having an inlet for water to be treated, an outlet for permeate and an outlet for concentrate, and an electrodeionization appliance having at least one concentrate chamber and at least one diluate chamber, each including an inlet and an outlet, wherein the concentrate outlet of the first membrane separation device is coupled to the inlet of the second membrane separation device, the permeate outlet of the first membrane separation device is coupled to the inlet of the diluate chamber, the permeate outlet of the second membrane separation device is coupled to the inlet of the concentrate chamber, and a device that degasses water which has an inlet coupled to the outlet of the concentrate chamber and the concentrate outlet of the second membrane separation device, and an outlet coupled to the inlet of the first membrane separation device.

DETAILED DESCRIPTION

Figure 1:
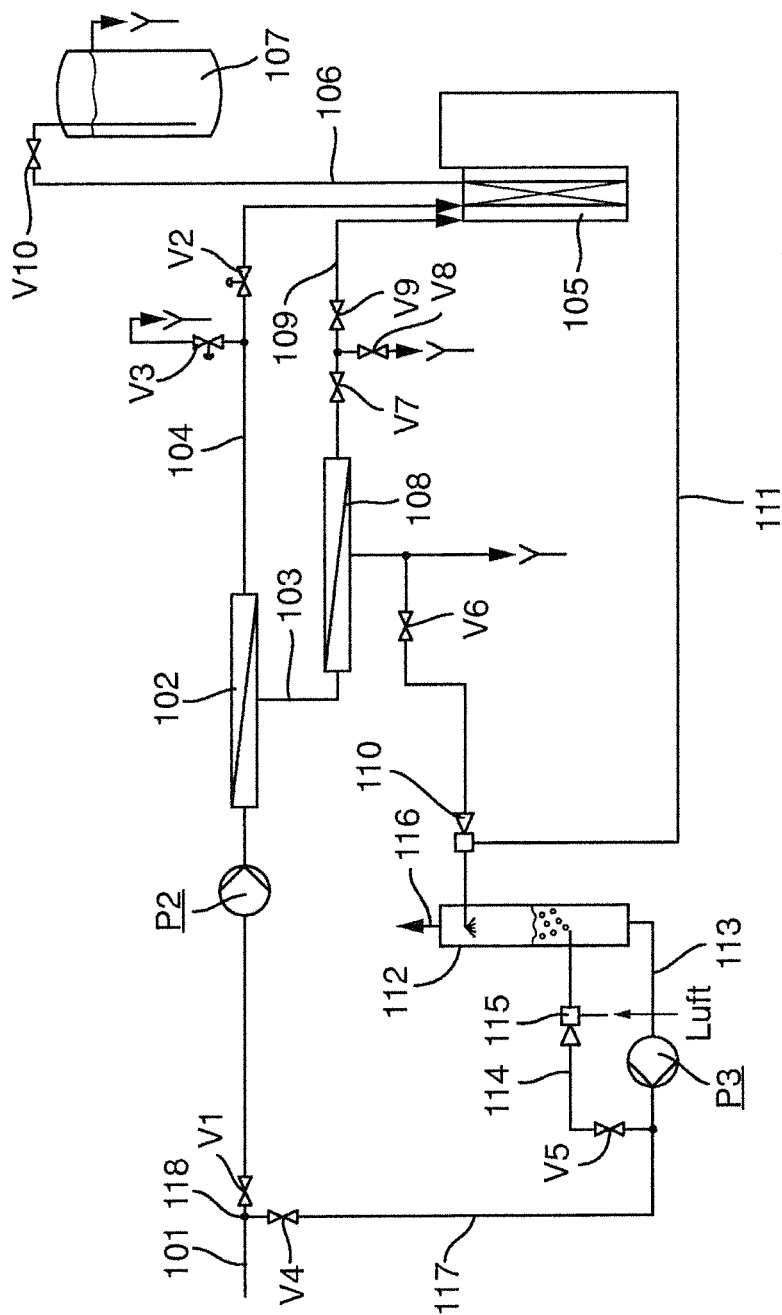
FIG. 1 shows a flow chart of an example of our process.

Our process is a multistage process of treating water, in particular to produce ultrapure water suitable for the applications mentioned at the outset. In the process, a raw water stream is first fed into a membrane separation stage and then further purified in a deionization stage downstream thereof. The membrane separation stage comprises a first and second membrane separation device and the deionization stage comprises at least one electrodeionization appliance which in turn comprises at least one concentrate chamber and at least one diluate chamber.

The raw water stream is preferably a softened water, that is to say water which, as defined at the outset, has been treated with a cation exchanger, in particular in the sodium form.

The membrane separation devices can be reverse osmosis or nanofiltration devices, optionally also a combination. For example, it is possible that the first and the second membrane separation device both are reverse osmosis devices, or otherwise the first can be a reverse osmosis device and the second a nanofiltration device.

Preferably, the first membrane separation device is a reverse osmosis device, and the second is a nanofiltration device. In this case, conductivity of the second permeate stream roughly corresponds to that of the raw water stream. This can be advantageous to the extent that this abolishes the necessity of artificially increasing the ionic conductivity in the concentrate chamber or chambers in the downstream electrodeionization appliance, for example, by the measures cited at the outset such as packing the concentrate chambers with ion-exchange resins. In particular this measure can be very disadvantageous. Packing the concentrate chamber with ion-exchange resins first causes an increase in the pressure drop and, second, in particular in parallel inflow of up to 50 concentrate chambers in so-called "plate-EDI modules," an elevated microbiological hazard in the concentrate rinse water which gives concern about recycling same.

Suitable electrodeionization appliances are, in particular, those having a wound roll structure. In this case, two ion-selective membranes are wound in the form of a spiral onto a rod- or tube-shaped electrode, preferably the anode.

The two membranes generally connect to one another at the edge regions, for example, by welding. Together they form a first intermediate space which serves as concentrate chamber. This can be packed with an ion-exchange resin, but need not be. In particular, if a sequence of reverse osmosis and nanofiltration connects upstream of the electrodeionization appliance, the concentrate chamber is preferably not packed with ion-exchange resins.

Optionally, spacers are provided which define the spacing between the membranes. When winding the membranes, attention is paid to the fact that a spacing remains between individual turns of the wound roll, as a result of which a second spiral-shaped intermediate space is formed. This space serves as a diluate chamber. The exterior of the wound roll is confined by the counterelectrode, in particular the cathode.

If appropriate, the concentrate chamber and the diluate chamber are fed from the exterior. The water to be purified therefore flows preferably first to the cathode and is passed turn by turn into the interior of the wound roll, where an outlet is provided.

As is known, in a process, also, the raw water stream to be treated is separated in the first membrane separation device into a first concentrate stream and a first permeate stream, wherein at least a part of the latter is fed into the at least one diluate chamber of an electrodeionization appliance in the downstream deionization stage. Therefrom, it exits again as a product stream. At least a part of the first concentrate stream, preferably the entire first concentrate stream, is processed similarly to the known processes in the second membrane separation device and in this case separated into a second concentrate stream and a second permeate stream. The second permeate stream is fed at least in part into the at least one concentrate chamber of the downstream electrodeionization appliance from which it exits again as third concentrate stream.

In particular, our process is distinguished in that the second and the third concentrate streams are degassed at least in part in a device that degasses water (degassing device) and are added to the raw water stream before it is fed into the membrane separation stage. Therefore, not only concentrate exiting from the second membrane separation device, but also concentrate exiting from the electrodeionization appliance is recycled, which, based on the amount of the raw water, significantly increases the water yield of the process.

In a single-stage membrane separation device, the water yield of an overall unit comprising a softener, a membrane separation device and an electrodeionization appliance is preferably 65-70%. In our process, the electrodeionization stage is operated with a water yield of 100%. Together with the second membrane device, therefore, the total water yield of the system can be increased to 85-90%.

Preferably, the second and the third concentrate streams are added to the raw water stream downstream of the degassing. In some examples, in contrast, it is preferred to add the concentrate streams to the raw water stream and to degas the mixture of the three streams. In this example, therefore, not only the concentrate streams are degassed, but also the raw water stream.

Recycling concentrate from electrodeionization appliances and feedback thereof into a membrane separation device is potentially a problem since concentrate from electrodeionization appliances generally can contain dissolved gases such as hydrogen or oxidation products such as chlorine, hydrogen peroxide and ozone which, under some circumstances, can damage the membranes in the devices. This is counteracted by the gaseous components of the third concentrate stream being separated off in the degassing device.

It is preferred that the second and/or the third concentrate stream and/or the raw water stream are injected into the degassing device, in particular via a single-fluid pressure nozzle. The aim of this measure is to atomize the liquids to be degassed as much as possible to facilitate the removal of gasses dissolved in the liquids such as hydrogen, chlorine or ozone.

Further preferably, the second and/or the third concentrate stream and/or the raw water stream are purged in the degassing device with a neutral gas, in particular with air. For this purpose, the air is blown or bubbled, preferably under pressure, into a mixture of the water streams.

Particularly preferably, the second concentrate stream is fed as propellant into a jet pump which generates a reduced pressure with which the third concentrate stream is drawn out of the at least one concentrate chamber of the electrodeionization appliance by suction. Preferably, the jet pump has a suction connection coupled to the at least one concentrate chamber of the electrodeionization appliance. Via the jet pump, the concentrate pressure in the electrodeionization appliance can be reduced, which can have a beneficial effect on the operating behavior thereof.

Some impurities originating from the electrodeionization appliance can have thoroughly beneficial effects. Thus, for example, hydrogen peroxide or ozone present in the third concentrate stream can serve to combat microbiological impurities in the raw water stream and/or in the second or third concentrate stream or in the mixture of the three streams, and thus prevent microbial contamination of downstream membrane separation devices.

Optionally, it can even be preferred to artificially increase the fraction of hydrogen peroxide and/or of ozone in the third concentrate stream. It is preferred to add oxygen, for example, by addition of air, artificially for this purpose to the second permeate stream entering into the electrodeionization appliance. Excess air can be removed in the downstream electrode-ionization appliance.

The excess of hydrogen peroxide can serve, for example, as reducing agent for any chlorine present in the water. This may dispense with the usual reduction of chlorine by sodium bisulfite addition, activated carbon filter, UV oxidation or similar known measures. With our process, free chlorine may be removed from raw waters down to 1.0 ppm before entry into the first membrane separation device.

In this connection, it has proved particularly advantageous to use the above-mentioned electrodeionization appliances having a wound roll structure and to feed these on the anode side with the first and the second permeate streams. The concentrate, therefore, on entry into the wound roll comes into contact with the anode, and on exit with the cathode. If the ion-selective membranes are wound around the anode, the flow direction of the diluate as well as of the concentrate within the coil runs preferably from the inside to the outside. In this case, additional oxygen can be generated at the anode which, at the cathode, leads to an increased production of hydrogen peroxide and a corresponding enrichment of same in the third concentrate stream.

This effect is promoted when the anode has a coating comprising iridium oxide or made of iridium oxide. The core of the anode preferably consists of titanium. The advantage of such a coating is the reduction of the anodic chlorine generation by up to 90%.

At the electrodes, the following electrode reactions usually take place:

$$H_2O \rightarrow 2H^+ + 2e^- + \tfrac{1}{2}O_2$$

$$2\,Cl^- \rightarrow Cl_2 + 2e^-$$

$$O_2 + \tfrac{1}{2}O_2 \rightarrow O_3 \qquad \text{Anode:}$$

$$2\,H_2O + 2e^- \rightarrow 2\,OH^- + H_2$$

$$H_2O + \tfrac{1}{2}O_2 \rightarrow H_2O. \qquad \text{Cathode:}$$

To counteract damage to membranes in the membrane separation devices, it can be preferred that the second and/or the third concentrate stream and/or the raw water stream are treated with a means of destroying or separating off oxidizing agents, in particular peroxides, before they are fed into the membrane separation stage. The means is preferably an adsorber or a catalyst. Those which are particularly suitable are catalysts based on noble metals, e.g., platinum or palladium catalysts, manganese dioxide, activated carbon and the like.

Regarding the unit, it always comprises:
a first membrane separation device having an inlet for water to be treated, an outlet for permeate and an outlet for concentrate,
a second membrane separation device having an inlet for water to be treated, an outlet for permeate and an outlet for concentrate, and
an electrodeionization appliance having at least one concentrate chamber and at least one diluate chamber, wherein these also each comprise an inlet and an outlet.

The concentrate outlet of the first membrane separation device is coupled to the inlet of the second membrane separation device, the permeate outlet of the first membrane separation device is coupled to the inlet of the diluate chamber and the permeate outlet of the second membrane separation device is coupled to the inlet of the concentrate chamber.

Compared to known units, our unit is distinguished in that it comprises a device that degasses water (degassing device), the inlet of which is coupled to the outlet of the concentrate chamber and the concentrate outlet is coupled to the second membrane separation device.

Functioning of the individual unit components has already been considered, and the corresponding details are hereby incorporated by reference.

Further features result from the following description of preferred examples. It may be emphasized explicitly at this point that all of the optional aspects of our process or of our unit described herein can each be implemented alone or in combination with one or more of the further described optional aspects of an example. The description herein of preferred examples serves merely for illustration and better understanding, and is in no way to be taken to be restricting.

FIG. 1 shows a flow chart of an example of our process. Via the line 101, a raw water stream (preferably a softened raw water stream) enters, which is transferred using the pump P2 into a first membrane separation device 102. Therein, the raw water stream is separated into a first concentrate stream and a first permeate stream. The permeate stream is transferred via the line 104 directly into the electrodeionization appliance 105, or into the diluate chamber of same. Via the line 106, the product stream exiting from the electrodeionization appliance 105 is transferred into a storage container 107. The first concentrate stream is fed via the line 103 into the second membrane separation device 108. Therein, the first concentrate stream is separated into a second concentrate stream and a second permeate stream. The second permeate stream is fed via the line 109 to the concentrate chamber of the electrodeionization appliance 105. The second concentrate stream is fed into the jet pump 110. Therein, the concentrate stream functions as propellant. The jet pump 110 generates a reduced pressure with which concentrate is drawn from the electrodeionization appliance 105 by suction via the line 111. The concentrate from the electrodeionization appliance is mixed with the second concentrate stream and injected into the degassing device 112. Therefrom, it can be removed by the pump P3 via the line 113, wherein, via the line 114, a partial or complete circulation is possible. The circulated medium can be admixed with air, for example, by the jet pump 115. The air and also gases that have been separated off such as the hydrogen generated in the electrodeionization appliance 105, can be removed via the outlet 116. The degassed mixture can be fed via the line 117 back to the first membrane separation device 102. For this purpose, at point 118, the degassed mixture is mixed with the raw water stream from the line 101.

Reference signs V1 to V10 designate in addition closeable valves.

Figure 2:
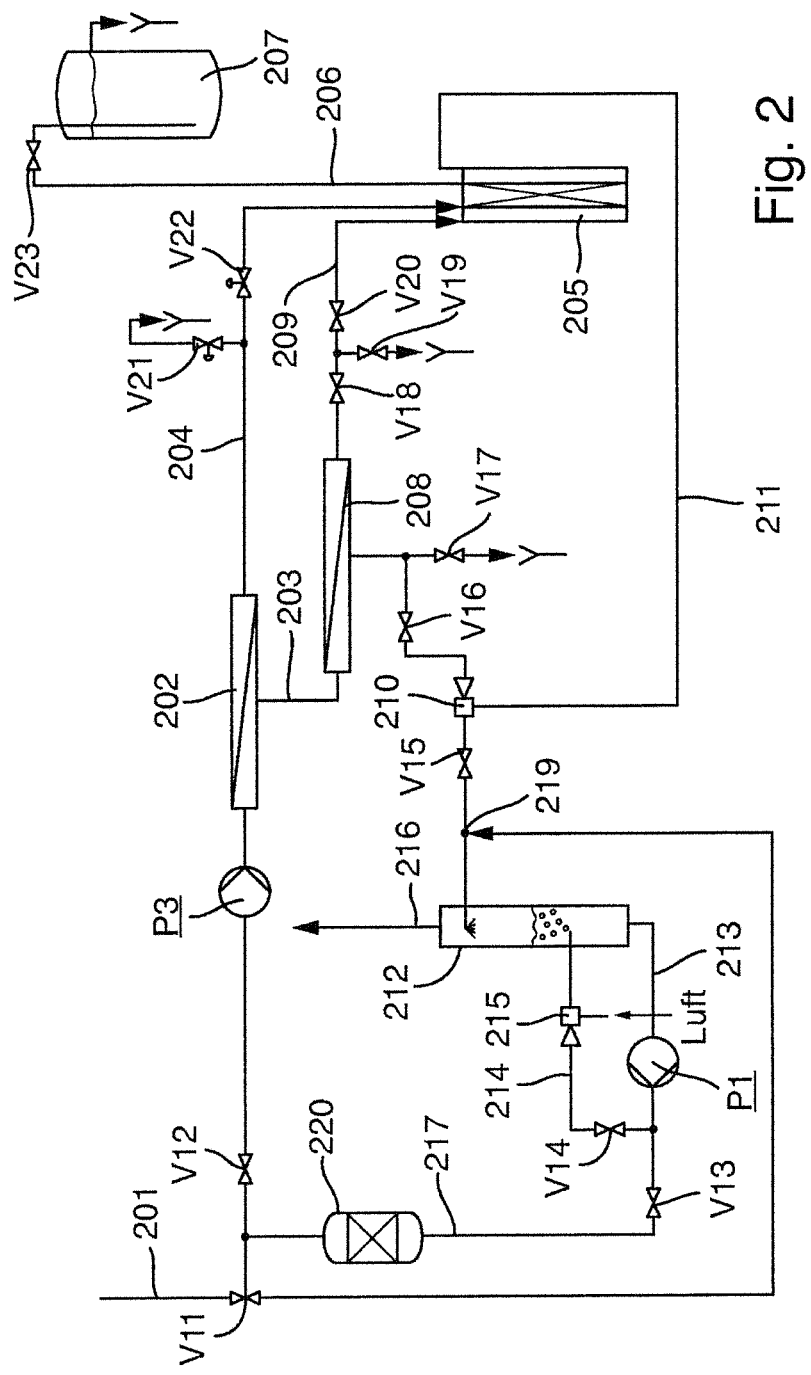
FIG. 2 shows a flow chart of an example of our process.

FIG. 2 shows a flow chart of an example of our process. Here also, a water stream is separated in a first membrane separation device 202 into a first concentrate stream and a first permeate stream. The permeate stream is transferred via the line 204 directly into the electrodeionization appliance 205, or into the diluate chamber of same. Via the line 206, the product stream exiting from the electrodeionization appliance 205 is transferred into a storage container 207.

The first concentrate stream is fed via the line 203 into the second membrane separation device 208. Therein, the first concentrate stream is separated into a second concentrate stream and a second permeate stream. The second permeate stream is fed via the line 209 to the concentrate chamber of the electrodeionization appliance 205. The second concentrate stream is fed into the jet pump 210. Therein, it functions as propellant. The jet pump 210 generates a reduced pressure by which concentrate is drawn out of the electrodeionization appliance 205 by suction via the line 211. The concentrate from the electrodeionization appliance is mixed with the second concentrate stream and injected into the degassing device 212. Therefrom, it can be removed by the pump P1 via the line 213, wherein, via the line 214, partial or complete circulation is possible. The circulated medium can in this case be admixed with air, for example, by the jet pump 215. Via the outlet 216, the air and also gases that are separated off such as the hydrogen generated in the electrodeionization appliance 205, can be removed. The degassed mixture can be fed via the line 217 to the first membrane separation device 202.

In a departure from the process shown in FIG. 1, the raw water to be purified is not transferred directly into the first membrane separation device 202. Instead, it is introduced via the line 201 and fed into the system at point 219. Here, it is mixed with the second and the third concentrate streams. Together therewith, the raw water is degassed in the degassing device 212. In addition, degassed solution is further treated in the adsorber 220 to destroy hydrogen peroxide from the deionization appliance 205.

The raw water introduced via the line 201 is preferably softened raw water. However, between the pump P1 and the membrane separation device 202, an additional softener can also be arranged. Preferably, this is arranged between the pump P1 and the adsorber 220.

The reference signs V11 to V23 additionally designate closeable valves.

Figure 3:
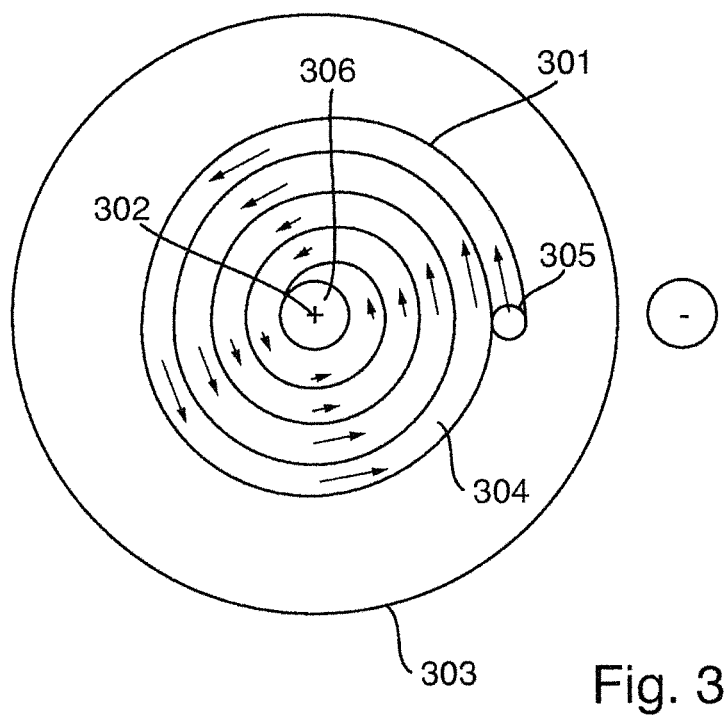
FIG. 3 shows a cross section through an electrodeionization appliance having a wound roll structure, which is particularly suitable for use in our process or our unit.

FIG. 3 shows a cross section through an electrodeionization appliance having a wound roll structure, which is particularly suitable for use in our process or our unit. The schematic drawing shows a spiral wound roll of a composite 301 of two ion-selective membranes (the two membranes, for the sake of clarity, are not shown separately). The core of the wound roll is formed by the anode 302, and the exterior of the wound roll is confined by the cathode 303. In the intermediate space between the individual turns of the membranes, the water to be deionized can flow into the diluate chamber 304 via the inlet 305. The outlet 306 is situated within the anode 302, which is constructed in a tubular shape. The concentrate flows between the two ion-selective membranes, that is to say within the composite 301 shown, but generally has the same direction of flow as the diluate. Inlets and outlets for the concentrate are not shown. The concentrate comes into contact here first with the cathode 303, then with the anode 302.

The invention claimed is:

1. A multistage process of treating a softened raw water stream that is first fed into a membrane separation stage and then further purified in a deionization stage downstream thereof, wherein
   the membrane separation stage comprises a first and a second membrane separation device and the deionization stage comprises an electrodeionization appliance having at least one concentrate chamber and at least one diluate chamber,
   the first membrane separation device is a reverse osmosis or nanofiltration device,
   the second membrane separation device is a reverse osmosis or nanofiltration device,
   the electrodeionization appliance has a wound roll structure and produces oxidizing agents to combat microbial impurities in the softened raw water stream,
   the electrodeionization appliance comprises an anode having a coating comprising iridium oxide or made of iridium oxide,
   the softened raw water stream in the first membrane separation device is separated into a first concentrate stream and a first permeate stream,
   the first concentrate stream is separated at least in part in the second membrane separation device into a second concentrate stream and a second permeate stream,
   the first permeate stream is fed into the at least one diluate chamber of the downstream electrodeionization appliance, from which the first permeate stream exits again as a product stream,
   the second permeate stream is fed into the at least one concentrate chamber of the downstream electrodeionization appliance, from which the second permeate stream exits as third concentrate stream comprising the oxidizing agents, and
   the second and the third concentrate streams are mixed with the softened raw water stream to form a mixture of the second and third concentrate streams and the softened raw water stream, and
   the mixture of the second and third concentrate streams and the softened raw water stream is treated with 1) an adsorber or 2) a catalyst to remove the oxidizing agents before the mixture of the concentrate streams and the softened raw water stream is fed into the membrane separation stage.

2. The process as claimed in claim 1, wherein the second and the third concentrate streams are added to the raw water stream upstream or downstream of the degassing.

3. The process as claimed in claim 1, wherein the second and/or the third concentrate stream and/or the raw water stream are injected into the device that degasses water.

4. The process as claimed in claim 1, wherein the second and/or the third concentrate stream and/or the raw water stream are purged with air in the device that degasses water.

5. The process as claimed in claim 1, wherein the second concentrate stream is fed as a propellant into a jet pump which generates a reduced pressure with which the third concentrate stream is drawn out of the at least one concentrate chamber by suction.

6. The process as claimed in claim 1, wherein oxygen is added to the second permeate stream before the permeate stream is fed into the at least one concentrate chamber of the downstream electrodeionization appliance.

7. A unit for treating a softened raw water stream, comprising:
   a membrane separation stage comprising
      a first membrane separation device comprises a first inlet for softened raw water to be treated, a first outlet for a first permeate stream, and a second outlet for a first concentration stream,
         wherein the first membrane separation device is a reverse osmosis or nanofiltration device,
         wherein the first membrane separation device separates the softened raw water stream into the first permeate stream and the first concentrate stream,
      a second membrane separation device comprises a first inlet for first concentrate stream to be treated, a first outlet for a second permeate stream, and a second outlet for a second concentration stream, wherein the second membrane separation device is a reverse osmosis or nanofiltration device,
wherein the second membrane separation device separates the first concentrate stream into the second permeate stream and the second concentrate stream,
a deionization stage comprising
an electrodeionization appliance having at least one concentrate chamber and at least one diluate chamber,
wherein the electrodeionization appliance produces oxidizing agents to combat microbiological impurities in the softened raw water stream and dissolved gases,
wherein the at least one concentrate chamber includes an inlet and an outlet,
wherein the at least one diluate chamber includes an inlet and outlet,
wherein the first permeate stream is fed into the at least one diluate chamber of the electrodeionization appliance from which the first permeate stream exits as a product stream,
wherein the second permeate stream is fed into the at least one concentrate chamber of the electrodeionization appliance from which the second permeate stream exits as a third concentrate stream,
wherein the third concentrate stream comprises the oxidizing agents and dissolved gases,
wherein the electrodeionization appliance has a wound roll structure and comprises an anode having a coating comprising iridium oxide or made of iridium oxide,
a device that degasses the dissolved gases in a mixture of the second concentrate stream, the third concentrate stream, and the softened raw water stream,
wherein the mixture of the second concentrate stream, the third concentrate stream, and the softened raw water stream exits via a line of the device,
an absorber or catalyst connected to the line to receive the mixture of the second concentrate stream, the third concentrate stream, and the softened raw water stream to remove the oxidizing agents before the mixture of the second concentrate stream, the third concentrate stream, and the softened raw water stream is fed into the membrane separation stage.

* * * * *